United States Patent
Schneider

(10) Patent No.: US 8,943,493 B2
(45) Date of Patent: Jan. 27, 2015

(54) AUTOMATION OF APPLICATION DEPLOYMENT

(75) Inventor: James P. Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 1318 days.

(21) Appl. No.: 12/273,306

(22) Filed: Nov. 18, 2008

(65) Prior Publication Data

US 2010/0125840 A1 May 20, 2010

(51) Int. Cl.
 *G06F 9/44* (2006.01)
 *G06F 9/445* (2006.01)

(52) U.S. Cl.
 CPC ...... *G06F 8/71* (2013.01); *G06F 8/65* (2013.01)
 USPC ............ 717/172; 717/120; 717/168; 717/171

(58) Field of Classification Search
 CPC .............. G06F 8/60; G06F 8/65; G06F 8/70; G06F 8/71
 USPC .................... 717/120–123, 168–178
 See application file for complete search history.

(56) References Cited

U.S. PATENT DOCUMENTS

| | | | | |
|---|---|---|---|---|
| 4,558,413 | A * | 12/1985 | Schmidt et al. | 717/170 |
| 5,675,802 | A * | 10/1997 | Allen et al. | 717/103 |
| 6,964,044 | B1 * | 11/2005 | Hudson et al. | 717/177 |
| 7,260,818 | B1 * | 8/2007 | Iterum et al. | 717/170 |
| 7,331,034 | B2 * | 2/2008 | Anderson | 717/103 |
| 7,620,602 | B2 * | 11/2009 | Jakstadt et al. | 705/40 |
| 7,680,932 | B2 * | 3/2010 | Defaix et al. | 709/225 |
| 7,822,683 | B2 * | 10/2010 | Jakstadt et al. | 705/40 |
| 7,844,622 | B1 * | 11/2010 | Lackey et al. | 707/769 |
| 8,037,453 | B1 * | 10/2011 | Zawadzki | 717/123 |
| 8,132,166 | B2 * | 3/2012 | DeHaan | 717/177 |
| 8,185,891 | B2 * | 5/2012 | DeHaan | 717/177 |
| 2001/0011265 | A1 * | 8/2001 | Cuan et al. | 707/1 |
| 2001/0032181 | A1 * | 10/2001 | Jakstadt et al. | 705/40 |
| 2002/0144255 | A1 * | 10/2002 | Anderson | 717/174 |
| 2003/0182652 | A1 * | 9/2003 | Custodio | 717/122 |
| 2004/0133444 | A1 * | 7/2004 | Defaix et al. | 705/1 |
| 2005/0015762 | A1 * | 1/2005 | Steckler et al. | 717/176 |
| 2005/0044531 | A1 * | 2/2005 | Chawla et al. | 717/172 |
| 2005/0131814 | A1 * | 6/2005 | Jakstadt et al. | 705/39 |
| 2005/0257215 | A1 * | 11/2005 | Denby et al. | 717/172 |
| 2006/0101443 | A1 * | 5/2006 | Nasr | 717/163 |
| 2006/0184928 | A1 * | 8/2006 | Hughes | 717/168 |
| 2007/0100903 | A1 * | 5/2007 | Cherry | 707/201 |
| 2008/0288938 | A1 * | 11/2008 | DeHaan | 717/177 |
| 2008/0288939 | A1 * | 11/2008 | DeHaan | 717/177 |

(Continued)

OTHER PUBLICATIONS

"Distributed Source Code Management—Niche or Trend?: The Q&A," Jun. 26, 2007, [http://redmonk.com/sogrady/2007/06/26/dscm/], p. 1-5.*

(Continued)

*Primary Examiner* — Qing Chen
(74) *Attorney, Agent, or Firm* — Lowenstein Sandler LLP

(57) ABSTRACT

Some embodiments of automating application deployment have been presented. In one embodiment, a production repository is created in a federated source code management system to accept software from only a single committer. The production repository is coupled to a set of repositories. Platform management infrastructure monitors the production repository for changes to the software. Further, the platform management infrastructure may automatically push the changes to one or more repositories affected.

18 Claims, 4 Drawing Sheets

(56) References Cited

U.S. PATENT DOCUMENTS

2009/0133006 A1* 5/2009 Cheung .......................... 717/144
2009/0288078 A1* 11/2009 Makonahalli et al. ........ 717/174

OTHER PUBLICATIONS

"Why distributed version control," Oct. 21, 2007, [http://www.wincent.com/a/about/wincent/weblog/archives/2007/10/why_distributed.php], p. 1-4.*

"Choosing a Distributed Version Control System," Dec. 28, 2007, [http://www.dribin.org/dave/blog/archives/2007/12/28/dvcs/], p. 1-5.*

"XMail Forum—Not receiving BCC mail from external pop server," <http://xmailforum.marketmix.com/index.php?showtopic=1662>, May 6, 2004, p. 1-3.*

Red Hat, Inc., "Documentation for the Genome Tooling", 2008, 34 pages.

"Git—Fast Version Control System", 2008, 4 pages.

* cited by examiner

AUTOMATION OF APPLICATION DEPLOYMENT

TECHNICAL FIELD

Embodiments of the present invention relate to software applications, and more specifically to automating deployment of software applications.

BACKGROUND

Conventionally, a life cycle of a software application includes at least the following stages: development, quality assurance, and deployment. In addition, updates are often made to software applications after deployment. For example, a patch or an upgrade of the software application may be made via an update.

Typically, a software application may be deployed to multiple platforms or systems having different configurations. Because of the different configurations, these platforms may each have its unique set of requirements for software at different stages of its life cycle. As such, the software application may have to be deployed in different ways depending on the types of platforms.

Because of these complicated considerations, software applications are typically deployed manually in order to accommodate the different requirements of various platforms. For instance, to deploy a software application, all of the content relevant to the application is marked as ready to be deployed in a centralized software repository by tagging, and then exported from the centralized software repository to application servers. Likewise, when there is update of the software application to deploy, one has to manually repeat this process in order to deploy the update to systems that are affected. This is an error-prone, labor-intensive process. If something is incorrectly tagged, either necessary changes or updates do not make it into production, or code plagued with errors that was not meant for production does get into production. To safeguard against the above mishap, a person (such as a system administrator) has to monitor and validate the deployment process at each stage.

BRIEF DESCRIPTION OF THE DRAWINGS

The present invention is illustrated by way of example, and not by way of limitation, in the figures of the accompanying drawings and in which.

DETAILED DESCRIPTION

Figure 1:
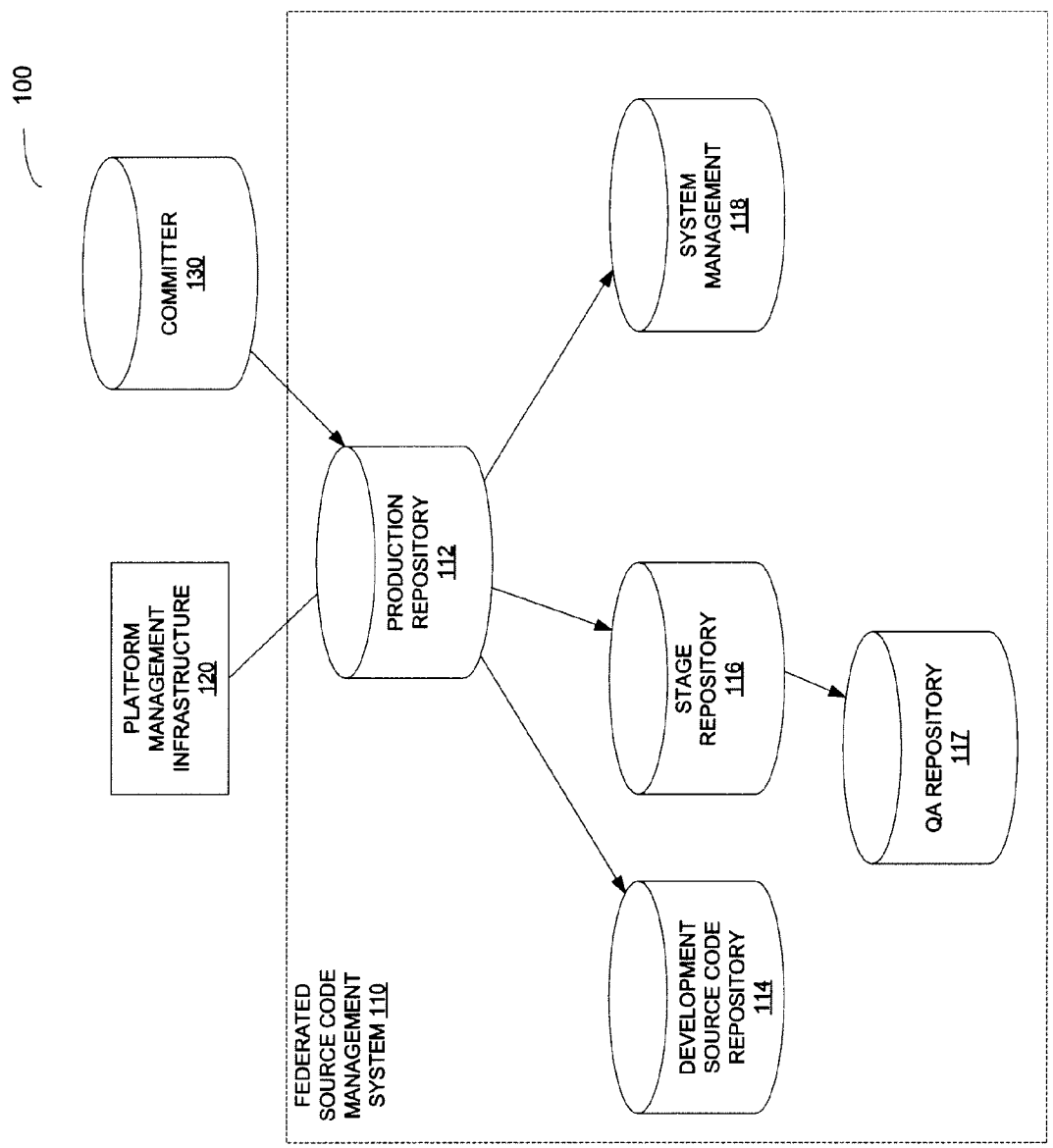
FIG. 1 illustrates one embodiment of a system in which embodiments of the present invention may be implemented.

Described herein are some embodiments of automating application deployment. In one embodiment, a production repository is created in a federated source code management system to accept software from only a single committer. In other words, the production repository is set up as a central gold standard repository in the federated source code management system. The production repository is coupled to a set of repositories. The set of repositories are set up to pull software and updates from the production repository. But the production repository is not allowed to pull anything from the set of repositories. Platform management infrastructure monitors the production repository for changes to the software. When the platform management infrastructure detects changes to the software in the production repository, the platform management infrastructure may automatically push the changes to one or more repositories affected. As such, both initial deployment of software and deployment of updates to the software across different platforms can be automated. More details of some embodiments of automating application deployment are described below.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a machine-readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required operations. The required structure for a variety of these systems will appear from the description below. In addition, the present invention is not described with reference to any particular programming language. It will be appreciated that a variety of programming languages may be used to implement the teachings of the invention as described herein.

FIG. 1 illustrates one embodiment of a system in which embodiments of the present invention may be implemented. The system 100 includes a federated source code management system 110 and platform management infrastructure 120. As used herein, a federated source code management system broadly refers to a software management system capable of handling source code as well as binary objects (such as installation packages and application archives). The federated source code management system 110 includes a production repository 112, a development source code repository 114, a stage repository 116, a quality assurance (QA) repository 117, and a system management repository 118. The production repository 112 is directly or indirectly coupled to all of the remaining repositories in the federated source code management system 110. The production repository 112 is further coupled to a single committer 130 and the platform management infrastructure 120.

Note that any or all of the components of the system 100 and associated hardware may be used in various embodiments of the present invention. However, it can be appreciated that other configurations of the system 100 may include more or fewer devices than those discussed above. For example, the system 100 may include more repositories than those illustrated in FIG. 1 in some embodiments.

In some embodiments, the repositories in the federated source code management system 110 are logically separate from each other. However, the repositories are may be implemented on a single data storage device, or on multiple data storage devices. Furthermore, these repositories may be set up to accept updates from one or more of the other repositories according to a set of rules determined by the owner of the respective repository. In one embodiment, the production repository 112 is set up as a central gold standard repository and other repositories are allowed to pull software and updates from the production repository 112. However, the production repository 112 is allowed to accept software and updates of software from the single committer 130. As such, the federated source code management system 110 may manage initial deployments of applications from the production repository 112. New production deployments may take the latest version (which may be referred to as the "head" revision) of the software in the production repository 112.

In some embodiments, the federated source code management system 110 operates with the platform management infrastructure 120 to automate the process of deploying applications and updates to various application servers. The platform management infrastructure 120 may monitor and manage the deployment and configuration of virtually any arbitrary combination of systems. In one embodiment, the platform management infrastructure 120 monitors the production repository 112 by periodically checking the production repository 112 for updates and/or new configuration. If there is update and/or new configuration available in the production repository 112, the platform management infrastructure 120 makes it available to repositories affected in the federated source code management system 110.

Using the above approach, the federated source code management system 110 and the platform management infrastructure 120 greatly simplify deployment of new applications as well as updates of applications by automating the deployment. Instead of manually tagging a software repository with a go-live tag and then manually exporting the repository in pieces to where it should go, the platform management infrastructure 120 allows each system to get the updates the respective system is configured to get, as soon as the updates are checked into the production repository 112.

In some embodiments, the system 100 can be reproduced downward. For example, the stage repository 116 is created based on the production repository 112. Further, the QA repository 117 is created based on the stage repository 116. By creating this chain of repositories in the federated source code management system 110, administrators no longer have to rely on ad-hoc approach to deploy applications and updates in each separate environment. Each environment would deploy its version of whatever the head revision is. As software progresses through QA, stage, and production, the software gets pushed upstream. Thus, the federated source code management system 110 and the platform management infrastructure 120 together can manage environment evolution automatically.

Figure 2:
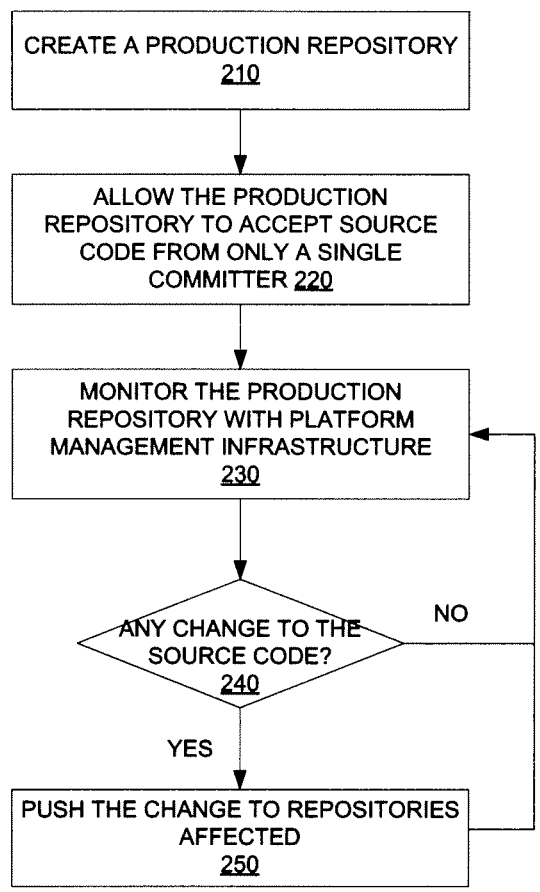
FIG. 2 illustrates a flow diagram of one embodiment of a method to automate deployment of applications and updates.

FIG. 2 illustrates a flow diagram of one embodiment of a method to automate deployment of applications and updates. The method may be performed by processing logic that may comprise hardware (e.g., circuitry, dedicated logic, programmable logic, microcode, etc.), software (such as instructions run on a processing device), firmware, or a combination thereof. For example, the federated source code management system 110 in FIG. 1 may perform at least part of the method.

Initially, processing logic creates a production repository in a federated source code management system (processing block 210). Some embodiments of the production repository have been discussed above. Processing logic may further configure the production repository such that the production repository is allowed to accept software from a single committer only (processing block 220).

Using platform management infrastructure, such as the platform management infrastructure 120 in FIG. 1, processing logic may monitor the production repository for changes (processing block 230). At block 240, processing logic determines if there is any change to the software in the production repository. If there is change to the software in the production repository, then processing logic pushes the change automatically to repositories affected using the platform management infrastructure (processing block 250) and then transitions back to block 230 to continue monitoring the production repository. Otherwise, if there is no change to the software in the production repository, then processing logic transitions back to block 230 to continue monitoring the production repository. By continuously monitoring the production repository, updates of the software in the production repository can be automatically detected and sent to the repositories affected.

Figure 3:
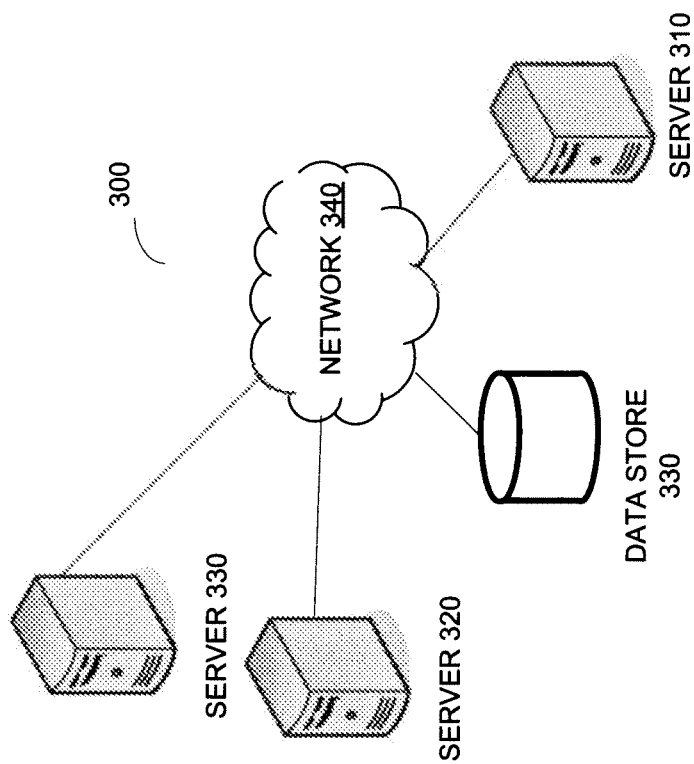
FIG. 3 illustrates one embodiment of a system in which embodiments of the present invention may be implemented.

FIG. 3 illustrates one embodiment of a system in which embodiments of the present invention may be implemented. The system 300 includes a number of servers 310-330, a data storage device 350, and a network 340. The servers 310-330 and the data storage device 350 are coupled to each other via the network 340. In some embodiments, the server 310 runs a federated source code management system (such as the federated source code management system 110 in FIG. 1) and platform management infrastructure (such as the platform management infrastructure 120 in FIG. 1).

The system 300 further includes the data storage device 350, which may be implemented on one or more of different types of devices (e.g., a magnetic tape drive, an optical disk drive, a flash memory drive, etc.). The data storage device 350 may be partitioned into multiple logical units, each associated with one of a set of multiple repositories of the federated source code management system. These logical units may be logically isolated from each other. Among these repositories, there is a production repository to accept software and updates from a single committer and to allow other repositories to pull the software and updates from it. The other repositories may be associated with various modules running on the servers 310, 320, and/or 330. For instance, one of the repositories may be associated with a system management module on the server 320. Alternatively, all the repositories may be associated with modules running on the server 310. Some embodiments of the production repository and other repositories have been discussed above. Using the federated source code management system and platform management infrastructure together, the server 310 automates deployment of applications and updates to different modules running on the servers 310, 320, and/or 330. Some embodiments of a method to automate deployment of applications and updates have been discussed above.

In some embodiments, the servers 310-330 and the data storage device 350 are communicatively coupled to the network 340. The network 340 may include various types of networks, such as a local area network (LAN), a wide area network (WAN), an intranet, the Internet, etc. The servers 310-330 and the data storage device 350 are illustrative examples of devices communicatively coupled to the network 340. It should be apparent that other types of devices may communicatively couple to the network 340 in other embodiments, such as a computing machine, such as a desktop personal computer (PC), a laptop PC, a personal digital assistant (PDA), a mobile telephone, etc.

Figure 4:
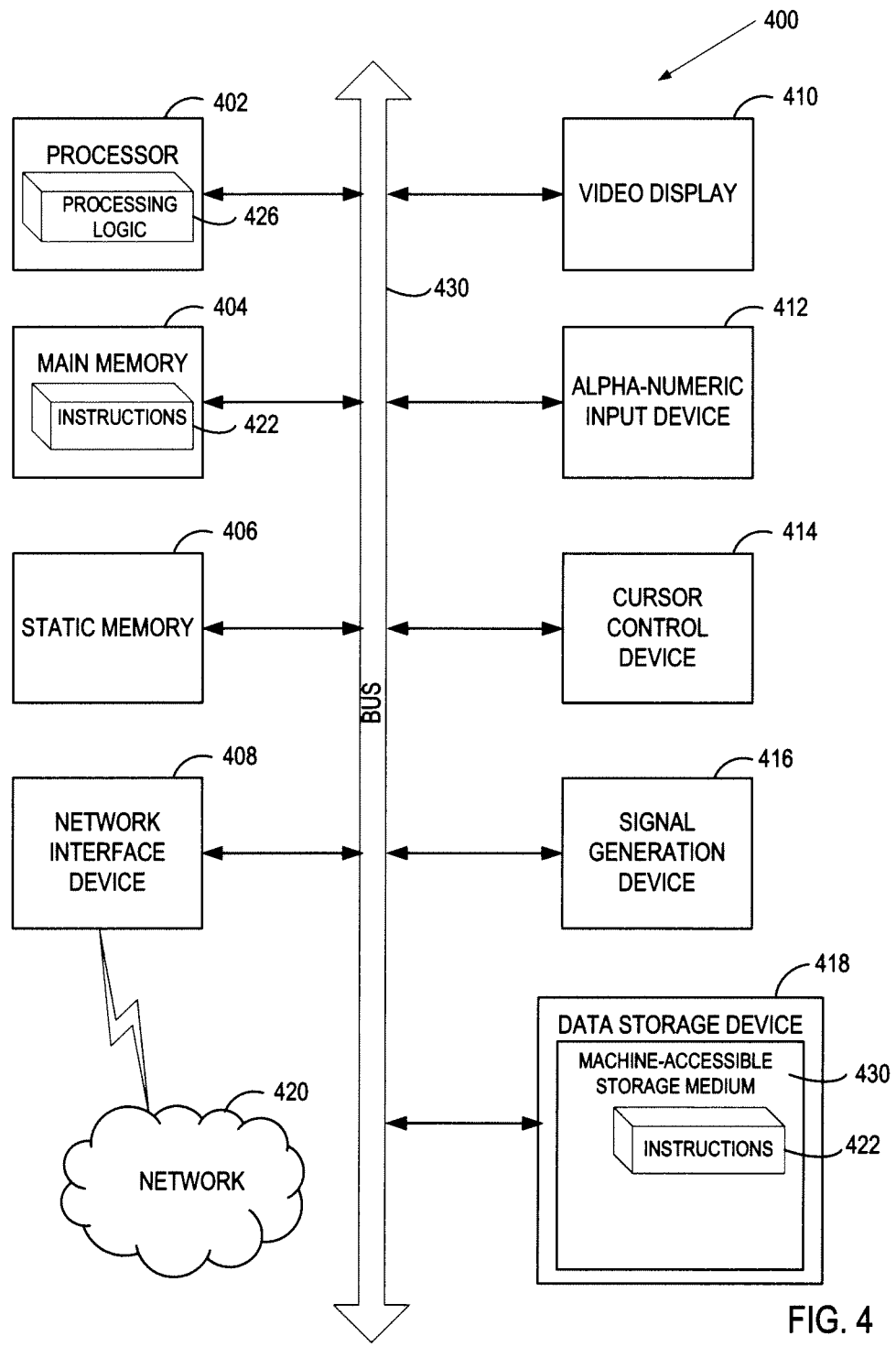
FIG. 4 illustrates a block diagram of an exemplary computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 430 (also known as a machine-readable storage medium) on which is stored one or more sets of instructions (e.g., software 422) embodying any one or more of the methodologies or functions described herein. The software 422 may also reside, completely or at least partially, within the main memory 404 and/or within the processing device 402 during execution thereof by the computer system 400, the main memory 404 and the processing device 402 also constituting machine-accessible storage media. The software 422 may further be transmitted or received over a network 420 via the network interface device 408.

While the machine-accessible storage medium 430 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, etc.

Thus, some embodiments of automating application deployment have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    creating, using a processing device, a production repository to accept software from only a single committer, wherein the production repository is communicably coupled to the single committer and a plurality of repositories, wherein the production repository does not pull the software from the plurality of repositories, and wherein the plurality of repositories are allowed to pull the software from only the production repository;
    monitoring, using the processing device, the production repository for changes to the software by periodically checking the production repository;
    when there are changes to the software in the production repository, pushing, using the processing device, the changes to the software from the production repository to one or more of the plurality of repositories affected by the changes to the software in the production repository;

creating, using the processing device, a stage repository based on the production repository;

creating, using the processing device, a quality assurance (QA) repository based on the stage repository; and pushing, using the processing device, the software through the production repository, the stage repository, and the QA repository sequentially.

2. The method of claim 1, wherein the plurality of repositories are logically separate from each other.

3. The method of claim 1, wherein the plurality of repositories comprise a quality assurance (QA) system.

4. The method of claim 1, wherein the plurality of repositories comprise a developer source code repository.

5. The method of claim 1, wherein the changes to the software comprise one of an update or a new configuration to the software.

6. The method of claim 1, wherein one of the plurality of repositories is associated with a module running on a first server and other of the plurality of repositories is associated with the module running on a second server, and wherein the first server is separate from the second server.

7. An apparatus comprising:
a memory; and
a processing device coupled to the memory to retrieve instructions from the memory and, in response to executing the instructions, the processing device to:
create a production repository to accept software from only a single committer, wherein the production repository is communicably coupled to the single committer and a plurality of repositories, wherein the production repository does not pull the software from the plurality of repositories, and wherein the plurality of repositories are allowed to pull the software from only the production repository;
monitor the production repository for changes to the software by periodically checking the production repository;
when there are changes to the software in the production repository, push the changes to the software from the production repository to one or more of the plurality of repositories affected by the changes to the software in the production repository;
create a stage repository based on the production repository;
create a quality assurance (QA) repository based on the stage repository; and
push the software through the production repository, the stage repository, and the QA repository sequentially.

8. The apparatus of claim 7, wherein the plurality of repositories are logically separate from each other.

9. The apparatus of claim 7, wherein the plurality of repositories comprise a developer source code repository.

10. The apparatus of claim 7, wherein the plurality of repositories comprise a quality assurance (QA) system.

11. The apparatus of claim 7, wherein the changes to the software comprise one of an update or a new configuration to the software.

12. The apparatus of claim 7, wherein one of the plurality of repositories is associated with a module running on a first server and other of the plurality of repositories is associated with the module running on a second server, and wherein the first server is separate from the second server.

13. A non-transitory computer-readable storage medium embodying instructions thereon that, when executed by a processing device, cause the processing device to perform operations comprising:
creating, using the processing device, a production repository to accept software from only a single committer, wherein the production repository is communicably coupled to the single committer and a plurality of repositories, wherein the production repository does not pull the software from the plurality of repositories, and wherein the plurality of repositories are allowed to pull the software from only the production repository;
monitoring, using the processing device, the production repository for changes to the software by periodically checking the production repository;
when there are changes to the software in the production repository, pushing, using the processing device, the changes to the software from the production repository to one or more of the plurality of repositories affected by the changes to the software in the production repository;
creating, using the processing device, a stage repository based on the production repository;
creating, using the processing device, a quality assurance (QA) repository based on the stage repository; and
pushing using the processing device, the software through the production repository, the stage repository, and the QA repository sequentially.

14. The non-transitory computer-readable storage medium of claim 13, wherein the plurality of repositories are logically separate from each other.

15. The non-transitory computer-readable storage medium of claim 13, wherein the plurality of repositories comprise a developer source code repository.

16. The non-transitory computer-readable storage medium of claim 13, wherein the plurality of repositories comprise a quality assurance (QA) system.

17. The non-transitory computer-readable storage medium of claim 15, wherein the changes to the software comprise one of an update or a new configuration to the software.

18. The non-transitory computer-readable storage medium of claim 15, wherein one of the plurality of repositories is associated with a module running on a first server and other of the plurality of repositories is associated with the module running on a second server, and wherein the first server is separate from the second server.

* * * * *